United States Patent

[11] 3,526,258

[72] Inventor  Donald L. Johnson
               1816 N. Lenore Drive, Tacoma,
               Washington 98406
[21] Appl. No. 630,396
[22] Filed    April 12, 1967
              Continuation-in-part of application Ser. No.
              456,625, May 18, 1965, now abandoned.
              This application April 12, 1967, Ser. No.
              630,396

[54] METHOD AND MEANS FOR IMPROVED PRODUCTION OF WOOD FLAKES
21 Claims, 44 Drawing Figs.

[52] U.S. Cl. ................................................ 144/162,
                   144/218, 144/241, 144/321; 277/205
[51] Int. Cl. ................................................ B27c 1/00
[50] Field of Search ........................................ 144/162,
                        176, 240, 242, 218, 321

[56]                References Cited
                UNITED STATES PATENTS
3,361,167  1/1968  Farnsworth .................  144/162

*Primary Examiner*—Gerald F. Dost
*Attorney*—Graybeal, Cole and Barnard

ABSTRACT: Method for combined hogging away of protuberances, slicing of wood flakes to thickness and length, jet breaking away to range of width and fluid conveying of wood flakes from; and in the producing of a flat face upon; the side of a log or cant employing a cutterhead assembly comprising a closure and optional hogging head on the face of which is detachably mounted a flaking and surfacing runner supporting preloaded holders of disposable blades in blade blocks, including jet breakers and fluid conveying of flakes through passageways, supported by fir tree anchorages and axial locks on the periphery of the runner along a helical-spiral bladeline.

A hogging, flaking and surfacing cutterhead assembly for use in the reduction of logs to wood flakes and rectangular lumber products.

3,526,258

METHOD AND MEANS FOR IMPROVED PRODUCTION OF WOOD FLAKES

CROSS REFERENCES TO RELATED APPLICATIONS

This application is a continuation-in-part of my U.S. Pat. application entitled, "Cutterhead Assembly for Thin Wood Flakes," Ser. No. 456,625, filed May 18, 1965, now abandoned.

This application is related to my companion application, Ser. No. 653,639, filed simultaneously with the present application entitled, "Process and Apparatus for Primary Breakdown of Roundwood," a continuation-in-part of my U.S. Pat. application entitled, "Process and Apparatus for Reduction of Logs to Flakes and Lumber," Ser. No. 456,624; filed May 18, 1965, now abandoned.

BACKGROUND OF THE INVENTION

1. Field of the Invention

This invention relates to method for the combined and simultaneous hogging away of any limbs, flares and other protuberances; the slicing, jet breaking and fluid conveying of wood flakes from; and in the production of a flat face upon; the side of a log or cant; and to an improved cutterhead assembly comprising a shaft mountable closure and optional hogging head with flake discharge passages, axial lock and fluid seal platforms and studs on its face detachably securing a flaking and surfacing runner supporting pressure bar blocks if required, preload holders of disposable blades, nozzles and cooperating flake passageways in blade blocks with fir tree anchorages and axial locks in a series on the periphery of the runner along a helical-spiral bladeline.

The flaking and surfacing runner, pressure bar block and blade block assembly is related to my issued U.S. Pats. 2,889,859; 2,949,946; 2,964,079; 3,240,245; 3,245,442; 3,262,476, and also to U.S. Pat. No. 3,155,130 of Logan and Sepall.

The present invention pertains to the improved production of wood flakes—thin flakes, for use in multi-ply plywood and as a new raw material for chemical processing, under about 1/20th inch in thickness and to thick flakes, generally compatible with conventional chips and for mechanical and chemical pulp, over about 1/20th inch in thickness—from wood logs and to production of rectangular timbers and lumber as residuals of flake production.

2. Description of the Prior Art

While the above flaking and surfacing inventions have been operable, there have been many problems and difficulties in configuration, manufacture and operation now to be indicated.

In the above inventions—as in conventional chippers, veneer lathes, flaking machines and the like—knives of quite substantial cross section were employed. Cutting edges were then ground and reground for reuse until such portion of the tool had been ground away as to render the part unusable and then discarded. This practice has some aspects which, upon analysis, are favorable and should be retained and others which are unfavorable and should be discarded.

The above practice means that the knifebars are removable. However, a knifebar, reground for reuse, constantly changes size and weight presenting problems in positioning and balancing. Applicant has concluded that it is not practical to require of an operator that he set up a cutterhead using reground knifebars of such precision that each knife is stepped, say 1/100th inch from the next, involving one hundred and more such knifebars and furthermore be in proper balance after assembly. Instead such a machine must be so arranged that its mere assembly places all cutting edges in proper position and balance and then be of sufficient durability to operate properly and reliably for a reasonably adequate length of time.

It is known that the best steel and other material for quality cutting tools is only available in thin sections. However, knifebars used heretofore were so large in cross section that only certain kinds of relatively unsatisfactory material could be used because of limitations in manufacture, cost and other factors.

The regrinding of one or more inclined surfaces making up a cutting edge produces surfaces containing numerous small scratches and a "wire edge" which must be boned away by hand. This is so laborious and costly of time that it simply cannot be accomplished. Corrosion also causes deterioration hastened by the presence of grooves and scratches. Fatigue from rapid repetition of cutting loads is another factor limiting the life of a cutting edge such that a "resharpened" knifebar is not as good as a "new" knifebar other factors being equal.

The technique of "micro-sharpening"—wherein the face side of the cutting edge as opposed to the veneer or flake side is shaped such that the face of the wood is compressed slightly as the knife passes through and along the wood—has long been known in the art of slicing of conventional veneer. The slight compression provides more of a splitting action in slicing the flake from the wood which aids in producing of quality flakes and surfaces and eliminates any tendency of the knife to pull into the work. It also means that a more blunt and therefore sturdier and more durable cutting edge may be employed. While it is very important, micro-sharpening is a very small, delicate, modification which could not be employed in the cutterheads of my earlier inventions.

The work of Logan and Sepall is a contribution in severing the end of the flake in the case of thick flakes where a considerable thickness of wood flake must be severed from the parent wood.

The cutting angle of a knifebar also needs to be easily changed for different species and end uses of the flakes.

Small blades, thin and razorlike, have long been used for other purposes. These can be economically produced continuously from thin strip of carbon, alloy and stainless steels and composites of several advantageous combinations possessing properties for cutting tools not available in large sections. These can be micro-sharpened and produced in many combinations of cutting angles and variations in severing the ends of the flakes. Since a very small amount of metal is involved and manufacturing costs are low, the blades may be disposed of after one use rather than resharpened. The cutting edge may be heat treated, ground, honed and otherwise processed to a near perfect cutting tool.

The force required to cut flakes from wood decreases almost linearly with the thickness of the flake. A razor like knifebar or blade 1x0.035x0.5 inches is as large and substantial a cutting tool relative to a .010 inch thick flake as a ⅞ inch thick knifebar is to a ¼ inch thick ⅛ chip or piece of veneer.

Blades and knives are subject to rapid repetition of stress due to cutting loads. In the length of a full operating day of 24 hours, a desired length of service from a set of blades, a cutterhead would be in operation about 21 hours and would probably be in the cut about ⅓ of the time or 7 hours. At a speed of rotation of say 1800 rpm, this equals 756,000 cycles or considering cracks and other interruptions about 1,000,000 cycles. This is below a critical fatigue figure for steel blades.

However, holders for the blades are more costly and must have a longer life than the blades. These should last for a long period, limited in most cases, only by impact with embedded foreign objects causing severe mechanical damage.

Screws and bolts used heretofore to hold knifebars in position, particularly small ones, are very laborious, not reliable at best and when many are involved the possibility of an operator leaving one or more loose with consequent loss of a knifebar is too great. Screws and bolts must be eliminated in the positioning and holding of blades and other parts.

A blade holder must be preloaded such that the preload is greater than the cutting load and yet within the elastic limit of the material to provide an adequate and firm clamping load on the blade and eliminate repetitious fatiguing stresses upon the lip of the blade holder.

As disclosed in my earlier U.S. Pat. 3,262,476, pressure bars are necessary for production of quality flakes and surfaces in flake thicknesses over about 1/20th inch. The pressure bars provided in my earlier patent were very difficult and costly to maintain in service.

Speed of cutting is another factor of importance. At high speeds, generally over about 10,000 feet per minute, thick flakes are shattered while thin flakes are cut and emerge undamaged in wide spiral ended flakes. The reason for this, to applicant's knowledge, has not been understood heretofore. At high speeds, the flake is "reflected" from the cutting angle or side of the blade much the same as light is reflected from a reflecting surface. This has the effect of doubling the cutting angle. Thin flakes, being flexible, simply bend, but thick flakes, being stiff and relatively rigid, break or shatter unless the speed is low enough so that the wood merely "flows" along the side of the cutting edge.

As disclosed in my U.S. Pat. 3,245,442, method and means must be provided to break the flake from the parent wood simultaneously with the slicing of the flake. The mechanical means provided heretofore was not satisfactory for thin flakes and very difficult to maintain for thick flakes.

Applicant has observed that when the knife is in the cut, the flake is flexed and under stress, is beginning to move away from the parent wood, yet is still attached and is entering a discharge passageway in which there is no flow of air. Another related problem, therefore, is the evacuation of the flake, particularly a thin flake, from the slicing area.

A flaking and surfacing head is similar in some respects to a runner for a steam or gas turbine. Peripheral speeds for cutterhead are from about 8,000 to 30,000 feet per minute while turbine blade speeds now exceed 60,000 feet per minute. Common loading on a 1-inch turbine blade is 100 pounds or comparable to severe loading experienced by a 1-inch blade slicing flake. Shock loading may be more severe, but on the other hand there are no high temperatures to weaken the metal.

The fir tree root has proven to be most efficient and reliable for turbine blades. The root has a high joint efficiency. Strong, reliable and fully calculable centrifugal forces preload and hold the blade in proper position. It is the same situation for the pressure bar and blade blocks of the present invention.

While the fir tree anchorage, generally parallel with the axis of rotation, is very good for resisting forces in the plane of rotation, another means is required to position and lock the root and block in proper axial position. An accurate and reliable lock is needed. Mere assembly should position and lock the root and block reliably in its correct location.

Logs, even after delimbing and debarking, have limb projections on the surface together with flares and other protuberances causing the surface wood at these places not to be of proper grain direction and quality for the desired quality wood flakes. Since the depth of cut made along the side of a traveling log by a flaking and surfacing cutter is definitely limited, to say 2 inches, in many cases, it would be necessary to take a pass along a log merely to remove these projections. Not only would this consume as much time as a productive cut, it would also usually result in the cutting and discharge of knotty, cross grain and slant grain particles in the flake supply.

A companion closure and hogging head is needed capable of hogging away any projections, of discharging this material separately from the flakes, of supporting removably the flaking and surfacing runner, with passages for discharge of the flakes and making a closure with a stationary flake collector.

A locking device is needed between the closure head and the removable flaking and surfacing runner capable of positive and accurate axial positioning of the fir tree root in the fir tree anchorage of the runner.

Logs are sometimes slivered on the surface after debarking and handling. Decay also is sometimes prevalent. Loose slivers and seriously decayed wood, not adequate in support or strength to withstand the cutting forces, are simply brushed aside. It is important that this unwanted material be separated out and discharged separately from the desired flakes. The cutterhead assembly must be so constructed that only sliced flakes may pass through and be admitted to the flake supply.

The pair of cutterheads will contain not only many cutting edges for flaking and surfacing, but also additional cutters for hogging of unwanted protuberances all subject to normal wear and tear plus damage from foreign objects of metal and rock sometimes embedded in logs. While this is the normal situation, damaging also to conventional equipment, provision must be made for mounting of the pair of heads such that one or both may be easily and quickly exchanged for newly set up heads for the above reasons and for change of flake size without lengthy and costly shutdown of the equipment.

The size of the cutterhead assembly is also important. It cannot be too small or too large. Its size must be suited to manufacture and use. A single general overall rotating diameter, diameter of face and depth of flaking assembly is desired varying only in the thickness, length and range of width of the flake product.

The cutterhead assembly of the present invention is necessarily a precision machine. Since it is also a new device, it follows that new specialized and costly manufacturing facilities are required for successful manufacture.

Since, however, it is also a universally useful device involving lumber, plywood and pulp; it is to be expected that a considerable mass market will develop provided a standardized configuration can be found such that the assembly may be mass produced for quality, interchangeability of parts and low cost—justifying the necessary investment in new manufacturing facilities.

SUMMARY OF THE INVENTION

A method of jet breaking away of wood flakes to a range of width simultaneous with slicing to thickness and length combined with fluid conveying of flakes from the slicing and breaking area in the production of wood flakes from logs, cants or boards and including the hogging of protuberances beyond the axial slicing depth discharging this material separately from desired flakes.

At the instant of slicing, a jet of compressed air, steam or other pressurized fluid may best be used to break the flake from the parent wood to desired range of width and to create a fluid flow to convey the flakes through the flake passageway serving also as a source of conveying medium in the following exhauster duct.

In use, a flaking and surfacing head has only about 1/6th of its circumference in the slicing area at one time. A much lesser volume of pressurized jet fluid is needed if the discharge can be confined to those nozzles in the work area.

Means must be provided for passage of air or other fluid under pressure from a stationary source to the nozzles of the rotating cutterhead.

The cutterhead assembly comprises a shaft mountable closure and optional hogging head with through flake passageways and axial blade block platforms on its face together with studs for detachably securing a flaking and surfacing runner supporting preloaded holders of disposable blades in a series on the periphery of the runner along a helical-spiral bladeline in blade blocks having fir tree anchorages to provide radial positioning and support while locks between the runner and closure head provide axial positioning. Pressurized fluid passages are provided in the closure head from an external source to seals at each of the blade blocks with passages leading to nozzles in the slicing area. Fluid flow is distributed only to those nozzles in the work area. Pressure bar blocks may be added ahead of each blade block for thick flakes.

Disposable blades, which may be mass produced in several variations of materials, cutting angles and means for severing the end of the flake, are provided. Blades are firmly clamped in proper position in preloaded blade holders pressed into the blade blocks. Centrifugal forces preload efficient and reliable fir tree anchorages while a unique and positive axial lock between the runner and the closure head locks each block in precise axial position. Mere assembly places all parts in proper position and balance. Once assembled no parts can be removed without removal of the few large taper seated mounting nuts. Small screws and bolts formerly required have been eliminated. Hogging cutters are added to the periphery of the closure head when necessary for removal of limbs, flares and other protuberances sometimes prevalent on the surface of debarked logs.

Objects of the invention are to provide:

a. a method of jet breaking away of flakes from the parent wood to a range of width simultaneous with slicing to thickness and length combined with fluid conveying of flakes from the slicing and breaking area;

b. a method of hogging away of protuberances combined with slicing, breaking and conveying of flakes from, and the producing of quality flat surfaces upon the side of logs and cants;

c. for distribution of pressurized jet fluid to nozzles only while in the slicing area;

d. a shaft mountable removable closure and optional hogging head with through flake discharge passageways, pressurized fluid passages, axial block positioning platforms, fluid seals, closure means with a stationary flake collector and means for detachably securing of a flaking and surfacing runner;

e. a flaking and surfacing runner for detachably securing to face of closure head employing reliable and fully calculable centrifugal forces preloading fir tree anchorages supporting blade blocks and pressure bar blocks when required with axial locks in a series along a helical-spiral bladeline;

f. preload blade holders for reliable clamping and precise positioning of disposable blades when installed in the blade holders;

g. disposable blades which may be mass produced of thin strip and composites for quality and low cost;

h. pressure bars and a reliable means of mounting as required generally for thick flakes compatible with conventional chips; and i. the geometry and mathematics necessary to manufacture the cutterhead assembly.

The cutterheads of the present invention may be quickly exchanged for replacement of cutting edges and for change of flake size. A single, standardized, easily maintained, safe and reliable configuration or cutterhead assembly for thin flakes, thick flakes and quality surfaces has been provided. It is universally useful and suited to mass production techniques for quality and quantity manufacture at low cost.

DESCRIPTION OF THE PREFERRED EMBODIMENTS

1. Method of Jet Breaking and Fluid Conveying.

Figures 12, 13, 14, 15, 16, 17, 18, 19, 20, 21, 22, 23, 24, 36, 37:
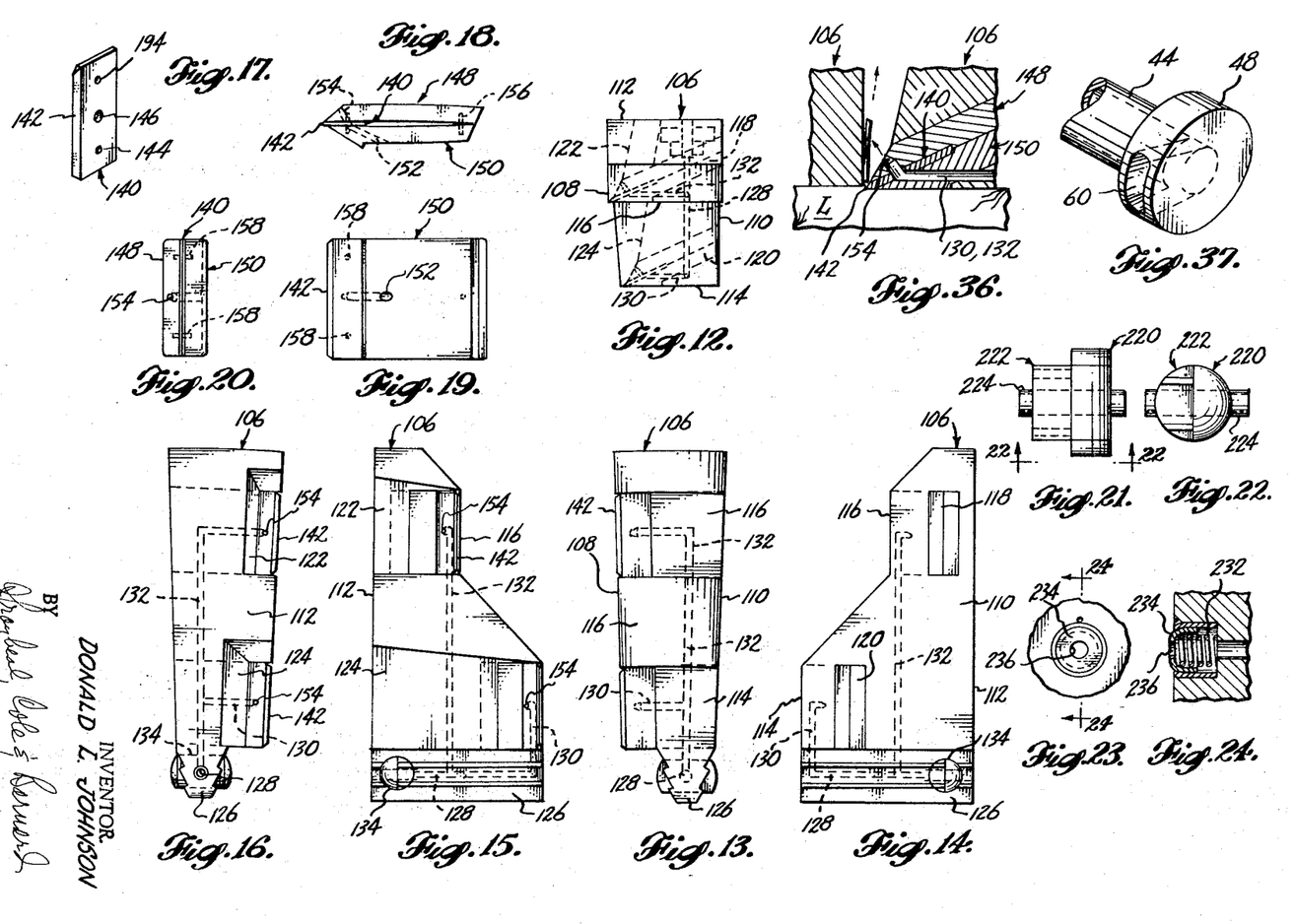
FIG. 12 is a top plan view of a thin flake bladeblock.
FIG. 13 is a face elevational view of the thin flake blade block of FIG. 12.
FIG. 14 is a rear elevational view of a thin flake bladeblock.
FIG. 15 is a front elevational view of a thin flake bladeblock.
FIG. 16 is a back elevational view of a thin flake blade block.
FIG. 17 is an isometric view of a thin disposable blade for use in the cutting of thin flakes.
FIG. 18 is an edge view of a pair of preload holders of thin disposable blades for the thin flake bladeblocks.
FIG. 19 is a side elevational view of the blade holder of FIG. 18.
FIG. 20 is an end view of the holder looking at the cutting edge of the disposable blade.
FIG. 21 is a plan view of an axial lock and fluid passageway for blade blocks.
FIG. 22 is an elevational view taken along the line 22—22 of FIG. 21.
FIG. 23 is an end view of the pressurized fluid seal used in the closure head to seal the fluid passage at the joint between the closure head and the blade blocks of the flaking and surfacing runner.
FIG. 24 is a sectional elevational view taken along line 24—24 of FIG. 23.
FIG. 36 is a diagramatic view showing a jet breaking a flake and fluid conveying simultaneous with the slicing of the flake from the parent wood.
FIG. 37 is an isometric view of the stationary tube and fluid distributor shown assembled in FIGS. 3 and 5.
Figures 25, 38:
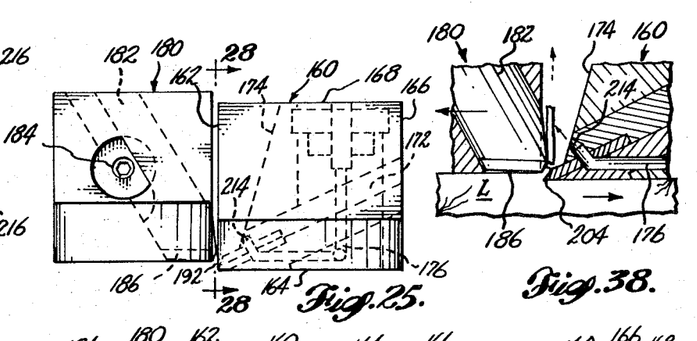
FIG. 25 is a top plan view of a pressure bar block and bladeblock for a thick flake head assembly of FIG. 4.
FIG. 38 is a diagramatic view showing a jet breaking a thick flake and fluid conveying simultaneous with the slicing of the flake from the parent wood.
Figures 26, 27:
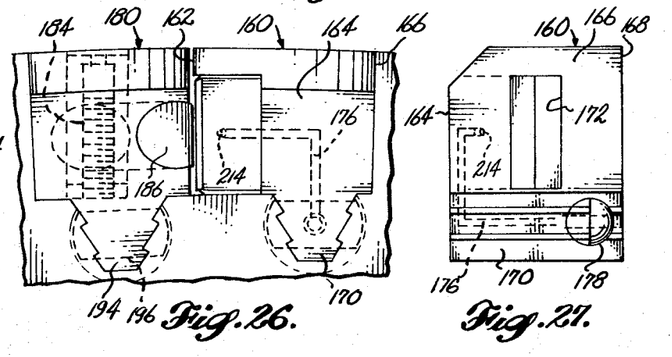
FIG. 26 is a face elevational view of the pressure bar block and thick flake blade block of FIG. 25.
FIG. 27 is a rear elevational view of a thick flake knifeblock of FIG. 25.
Figure 28:
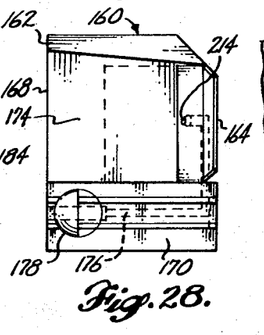
FIG. 28 is a front elevational view taken along the line 28—28 of FIG. 25.
Figure 29:
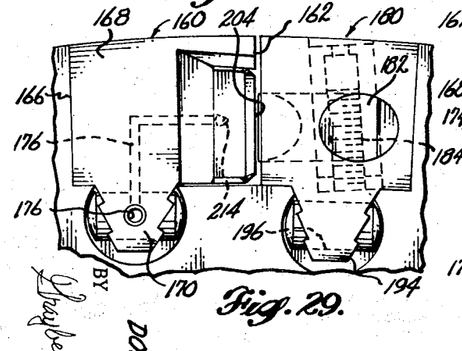
FIG. 29 is a back elevational view of the pressure bar block and knife block of FIG. 25.
Figures 30, 31, 32, 33:
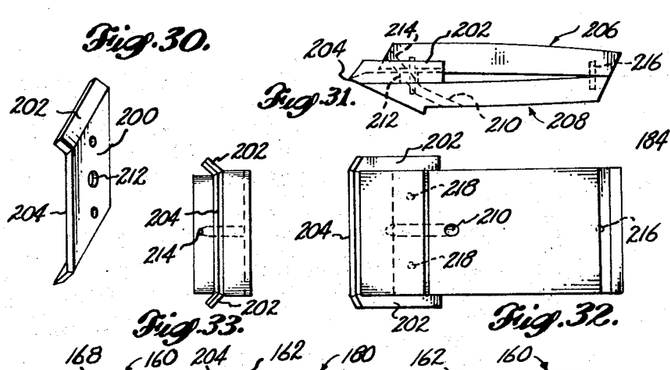
FIG. 30 is an isometric view of a disposable wing blade used for slicing of thick flakes.
FIG. 31 is an edge view of a pair of blade holders for the blade of FIG. 30 and the blade block of FIG. 25.
FIG. 32 is a side elevational view of the blade holder of FIG. 31.
FIG. 33 is an end view of the holder looking at the cutting edge of the disposable wing blade.
Figure 34:
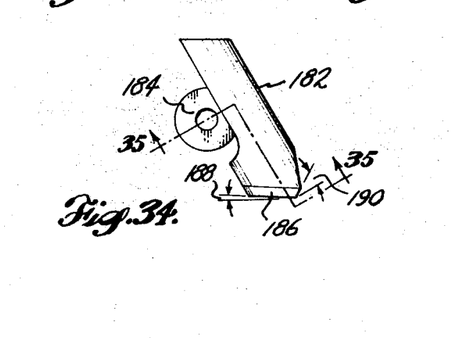
FIG. 34 is a plan view of the pressure bar and jack lock of the pressure bar block of FIG. 25.
Figure 35:
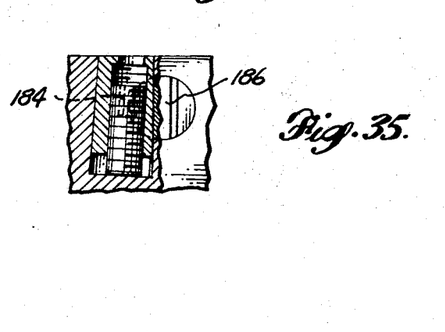
FIG. 35 is a sectional view 35—35 of FIG. 34 through the jack lock and shank of the pressure bar.
Figures 39, 40:
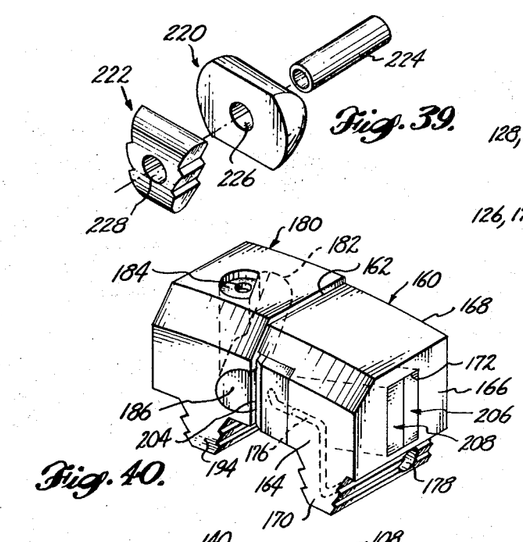
FIG. 39 is an exploded isometric view of the axial lock and fluid passage for the blade blocks.
FIG. 40 is an isometric view of the pressure bar block and blade block for the thick flake cutterhead assembly.
Figure 41:
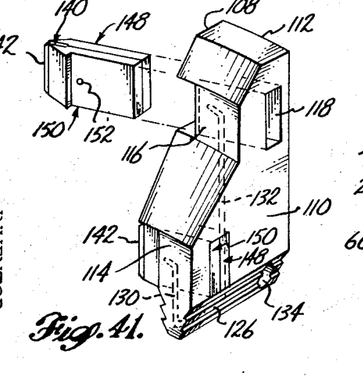
FIG. 41 is an isometric view of the thin flake blade block showing the upper blade holder removed or ready for installation in the rectangular slot of the blade block while the lower blade holder and blade is already in position.
Figures 42, 44:
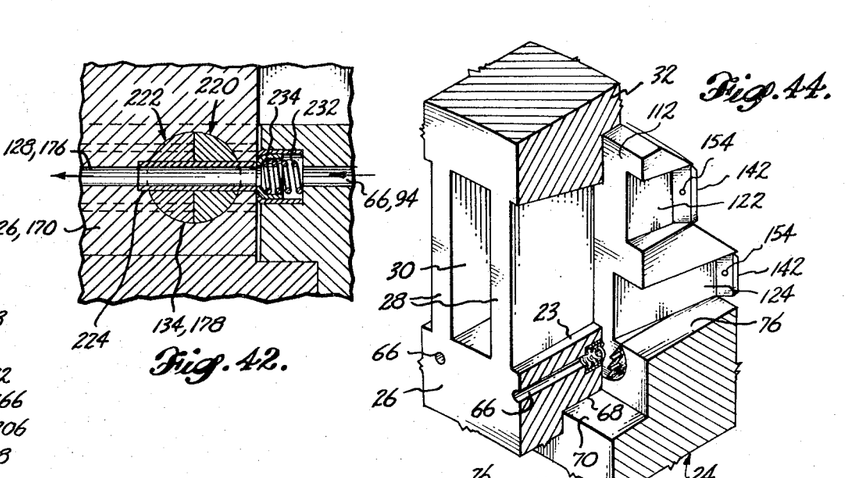
FIG. 42 is a partial cross sectional view further illustrating the fluid seal and passage between the closure head and the fir tree root of the blade block.
FIG. 44 is a partial perspective view showing a blade block in place and fixed in radial position by the fir tree anchorage and in axial position by the axial lock located between the stepped platforms of the closure head and the seat of the lock in the root of the runner.

Jet breaking and fluid conveying of flakes as they are sliced from the parent wood is shown in FIGS. 36 and 38. Steam, compressed air or other fluid under pressure may be used. The jet from passages 130, 132, 214 impinges on the side of the wood flake bending it further than the reflected angle in the case of thin flakes cut at high speed or more than the cutting angle in the case of thick flakes cut at slower speeds, breaking and pulling the wet and sticky flake from the parent wood, conveying it into the passageways 122, 124, 174 and into the slight vacuum of the exhauster duct. Here the air or other fluid serves as a source of conveying fluid necessary in the exhauster conveyor duct.

In the case of thin flakes, the nozzles are located to break the flakes to a ½—to—½ inch range of width and in the case of thick flakes to a ½—to—1 inch range. The nozzles may, of course, be moved from the locations shown to impinge on the flakes from other angles and to produce other widths of flakes.

2. Cutterhead Assembly.

a. Closure and Optional Hogging Head.

Figures 1, 2, 3:
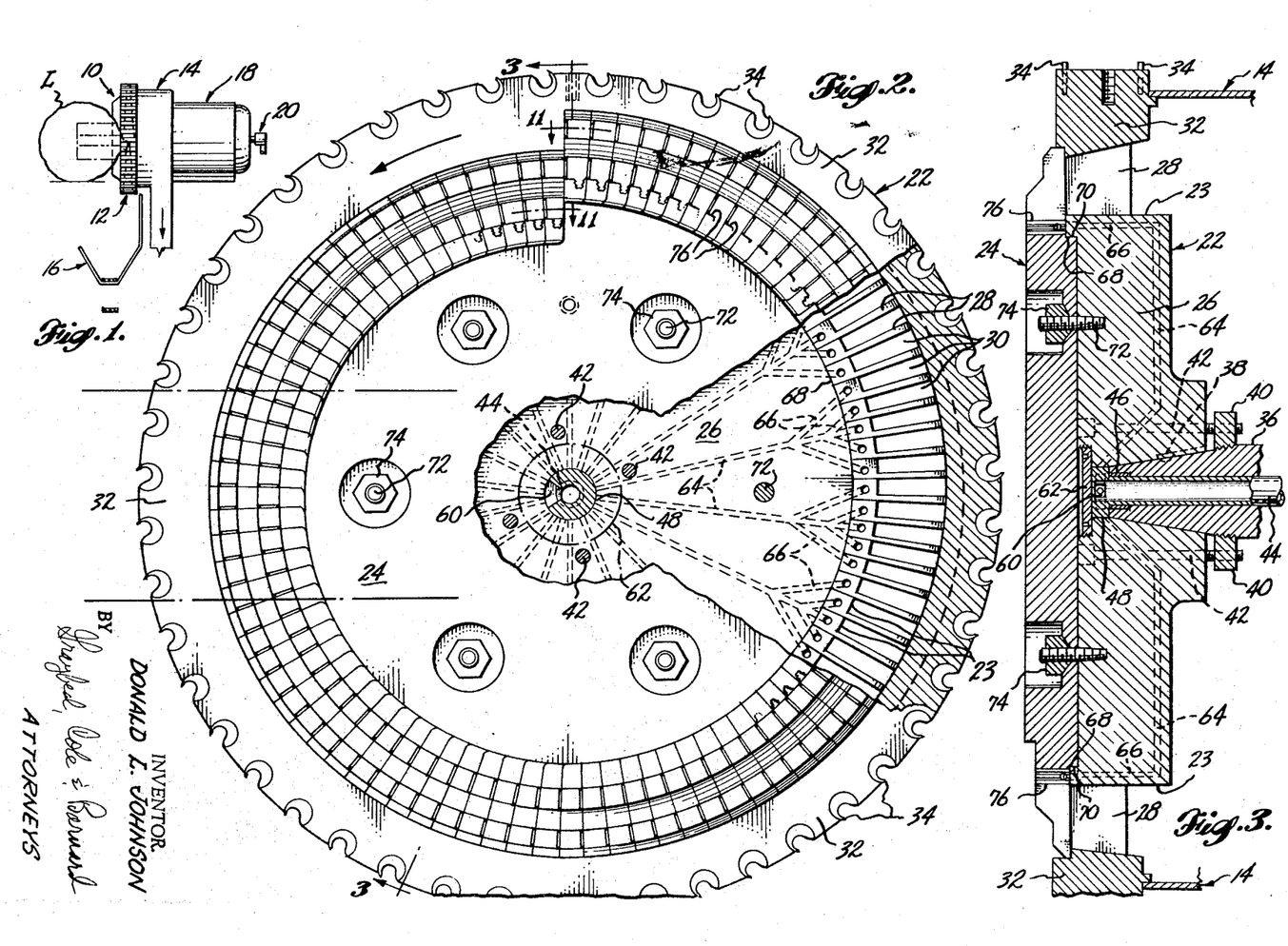
FIG. 1 is an infeed elevational view of a log, cant or board feeding into a hogging, flaking and surfacing cutterhead assembly of the present invention mounted on the extended shaft of a driving motor together with a waste conveyor, a flake exhauster duct and a rotary seal mounted on the extended shaft at the front end of the driving motor.
FIG. 2 is a face elevational view of a thin flake head and a closure head with optional hogging cutters comprising the cutterhead assembly—a portion of the flaking runner broken away to show the face and hidden features of the closure head.
FIG. 3 is a cross sectional view 3—3 of FIG. 2 further clarifying details of the cutterhead assembly, the fluid distributor and the shaft mounting.
Figures 4, 5:
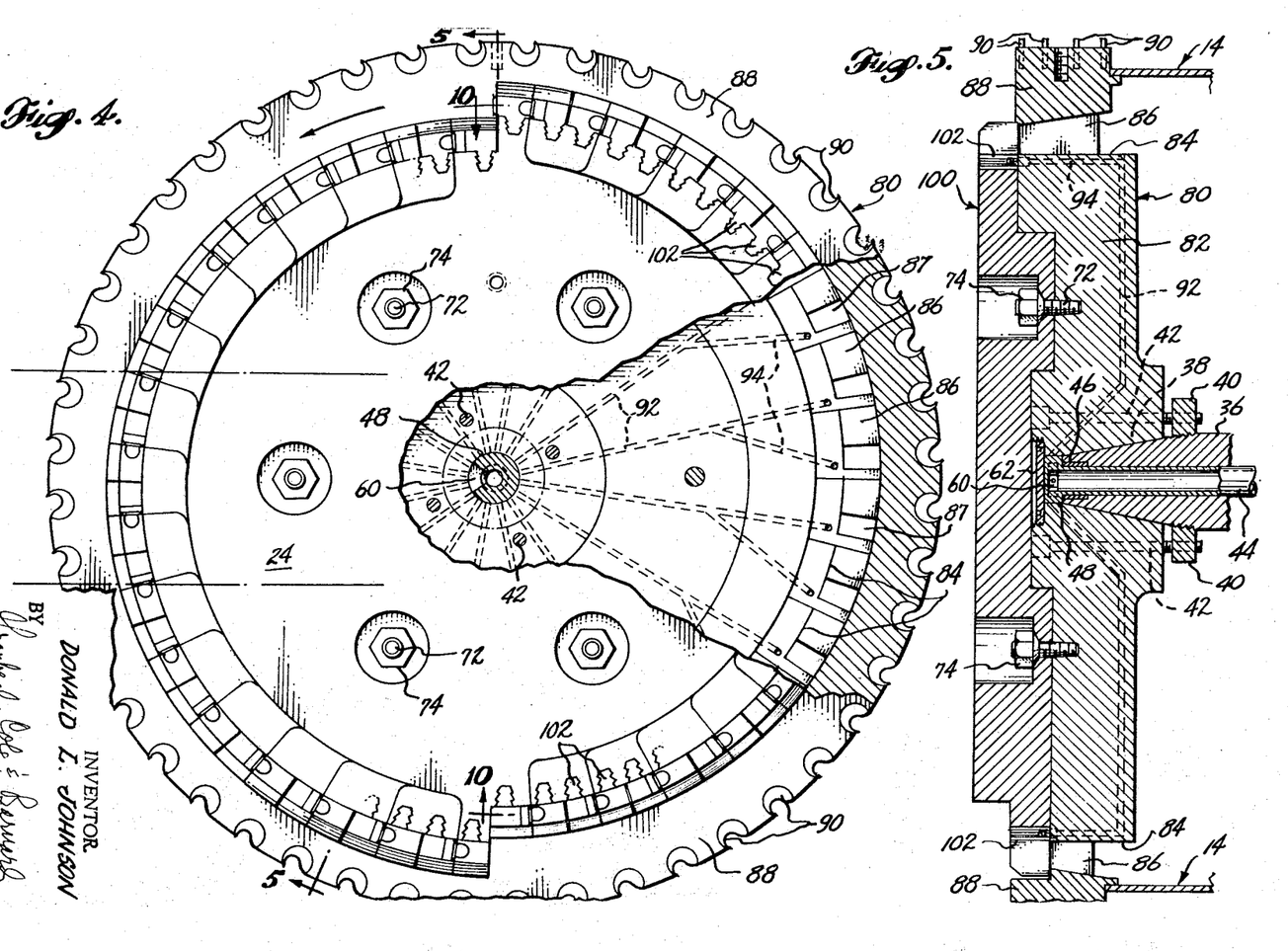
FIG. 4 is a face elevational view of a thick flake head and a closure head with optional hogging cutters comprising a cutterhead assembly of the same outer diameter, diameter of face and axial cut. as the thin flake assembly of FIG. 2 and exchangeable with the thin flake assembly on the shaft of the driving motor—a portion of the flaking runner broken away to show the face and hidden features of the closure head.
FIG. 5 is a cross sectional view 5—5 of FIG. 4 further clarifying details of the cutterhead assembly, the fluid distributor and the shaft mounting.

The closure and optional hogging head for the thin flake cutterhead assembly is shown as 32 in FIGS. 2 and 3, and as 88 for thick flake assembly in FIGS. 4 and 5. The closure heads are basically the same in either case varying only in the number of flake passageways, axial lock platforms and other variations necessary to make various sizes of flakes.

The closure head is preferably a single casting of ductile iron or other suitable material with a tapered central bore with a suitable keyway for removable mounting and true running on extended motor shaft 36. Bolts 42 threaded into shaft collar 40, taper threaded to shaft 36, serve to hold closure head removably to the shaft and, by variable tightening, provide some slight adjustment to a true running condition.

Figure 6:
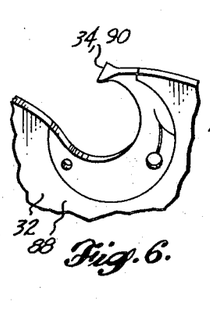
FIG. 6 is an isometric view of a conventional inserted saw tooth used as a hogging cutter.

Spokes 28, 86, delineate the flake passageways and serve to attach the outer rim to the central body of the closure head. In case the hogging cutters are desired, the flange or rim is made large enough to accommodate inserted tooth cutters 34, 90 shown in detail also in FIG. 6. When hogging cutters are not needed then the head may simply be smaller in diameter as shown dotted in FIG. 2.

A collector hood 14 meets with closure ridge on the flat discharge side of closure head serving to seal off the discharge flakes, permit rotation of the head and prevent contamination of flake supply by uncut material.

Hogging is the reduction of material presented to the hogging cutters to coarse sawdust. Saw teeth or any other suitable cutters may be employed. Inserted saw teeth commonly used on circular saws are satisfactory and may be removed and inserted without removal of the closure head.

Figure 7:
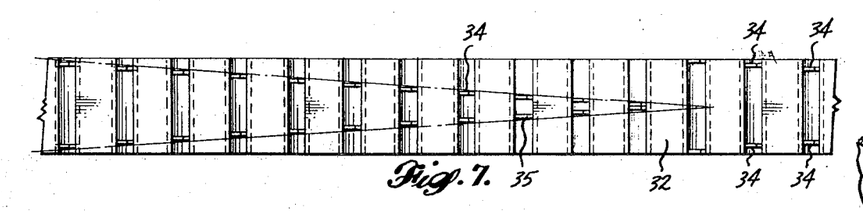
FIG. 7 is a developed peripheral view of an inserted saw tooth hogging arrangement for a thin flake cutterhead assembly of FIG. 2.
Figure 8:
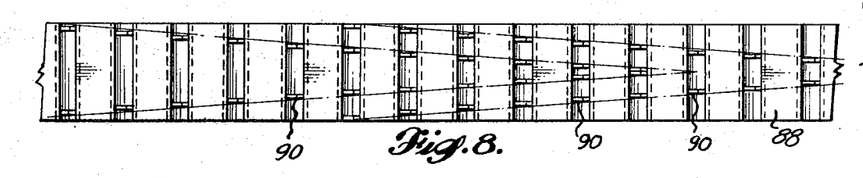
FIG. 8 is a developed peripheral view of an inserted saw tooth hogging arrangement for a thick flake cutterhead assembly of FIG. 4 operating at one-half the rotational speed of the thin flake assembly of FIG. 2.
Figure 9:
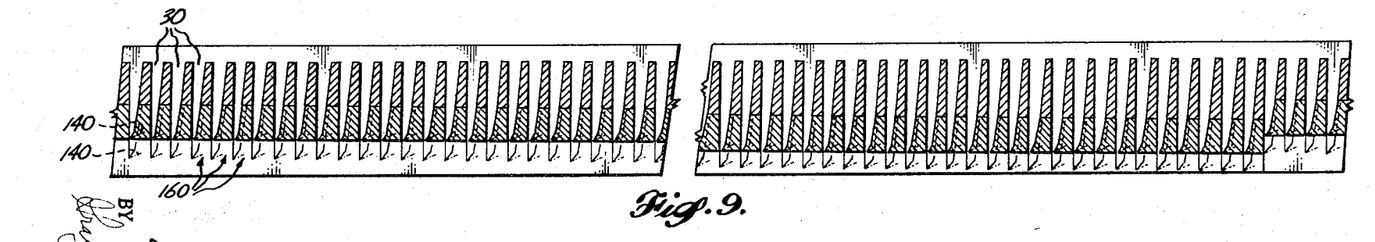
FIG. 9 is a developed sectional view 9—9 of FIG. 2 showing the axial advance of the blade blocks, the discharge passageways through the closure head and the flat closure back of the closure head for the thin flake assembly of FIG. 2.
Figure 10:
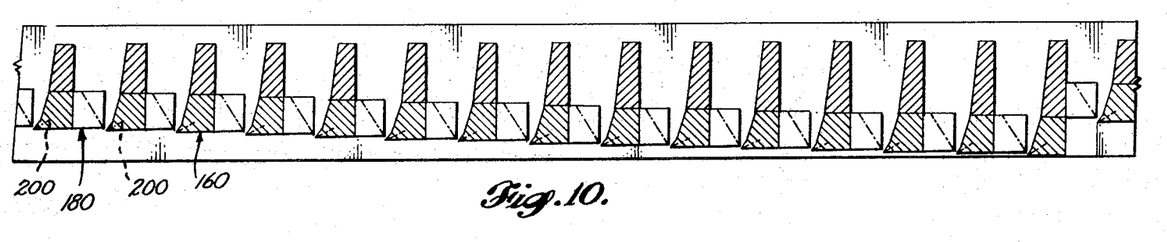
FIG. 10 is a developed sectional view 10—10 of FIG. 4 showing the axial advance of the pressure bar and blade blocks, the discharge passageways through the closure head and the flat closure back of the closure head for the thick flake assembly of FIG. 4.

Since the feed speed is controlled and synchronized with the speed of rotation of the cutterhead assembly, the cutters may best be arranged as shown in FIG. 7 for the thin flake assembly and as shown in FIG. 8 for the thick flake assembly rotating at half the speed of the thin flake assembly.

b. Flaking and Surfacing Runner.

The flaking and surfacing runner 24 is shown for the thin flake head assembly in FIGS. 2 and 3 and for the thick flake assembly in FIGS. 4 and 5. Runner 24 is removably mounted on the face of the closure head by stud bolts 72 and taper seat nuts 74. The taper seats serve to center the runner and also to lock the nuts such that they will not loosen in operation.

The body of the runner is preferably made in one piece of rolled steel plate or steel forging. Disposed about the periphery of the runner are the fir tree anchorages with bored seats 230 for the axial locks shown in greater detail in FIG. 43. The blade blocks 112 for the thin flake assembly are simply inserted into the fir tree anchorages of the runner from the back side. In the case of the thick flake head, pressure bar blocks 180 and blade blocks 160 are both inserted into fir tree anchorages from the back side of the runner.

c. Pressure Bar and Blade Blocks, Fir Tree Anchorages and Axial Locks, Blades and Preload Blade Holders.

FIGS. 12 through 16, together with 41 through 44, illustrate a thin flake blade block 106. Blade block 106 has a front side 108, a rear side 110, a back side 112, a lower front face 114 and an upper front face 116. The block has a lower blade holder slot 120 and an upper blade holder slot 118 extending at an angle to the face generally from the front working edge through to the rear of the block. The slots are so located that each conforms to the helical-spiral bladeline. Each slot has its own flake passageway 122, 124 expanding to the back and cooperating with the flake passageway of the closure head when assembled. Fir tree root 126 extends across the lower end of block 106 from face 114 to back side 112. Near back side 112 and in the fir tree root is a transversely cut round hole 134 for receiving the axial lock to be described in detail hereinafter.

The thin flake blade and blade holder is shown in FIGS. 17 through 20. Thin flake blade 140 is a flat strip of suitable material having cutting edge 142 and mounting pin holes 144. The holders for blade 140 are generally rectangular plates 148 and 150 of spring steel or like material. The blade is placed on the locator pins in one of the pair of holders on the pins. The blade holders are arched with concave surfaces opposing each other and against the blade. When the pinned together assembly is pressed into the blade holder slots of the blade blocks, the arches are depressed gripping the blade firmly between the inner and now parallel faces of the blade holders. A stop on blade holder 150 positions the assembly in the precisely located slot of the blade block. Arch deflections of 0.003 inches and higher for each half of the blade holder with resulting pressures of 1000 pounds and more are attainable within the elastic limit of spring materials. Blade holder assemblies may be pressed into position and removed using a small hydraulic cylinder or other pressure means in a holding jig.

FIGS. 25 through 29, 34 and 35 show the thick flake blade block and its cooperating pressure bar block. The blade block 160 has front side 162, face 164, back 168 and rear side 166. A blade holder slot 172 extends to an angle to the face generally from the front working edge through to the rear of the block. A flake passageway expands to the back side and cooperates with the passageway in the closure head when assembled. Fir tree root 170 extends across the lower end of block 160 from face 164 to back side 168. Near back side 168 in the fir tree root is a transversely cut round hole 178 for receiving the axial lock.

Pressure bar block 180 contains pressure bar 182 which positions the carbide pressure face slightly rearwardly and less than the thickness of the flake axially from the cutting edge of the blade in the blade block. Pressure bar 182 is set into a bored hole in the pressure bar block and locked into position by means of jack lock 184 as shown in FIGS. 25 through 29, 34 and 35. Carbide portion 186 is attached to the end of bar 182 by brazing or other means. An approach compression angle 188 (FIG. 3) of about two degrees with a relief angle 190 with the cutting angle of the blade, is satisfactory in most cases. Pressure bar block also has fir tree root with a transversely cut hole 196 to receive the axial lock.

FIGS. 30 to 33 show the thick flake disposable blade and blade holders. The blade 200 is similar to the thin flake blade, but heavier and includes the wing at one end of the cutting edge 204 or at both ends as shown so that a single blade may be used for both right and left hand heads. Arched blade holders 206 and 208 also are similar to those for thin flakes, but heavier and larger.

The fir tree roots are a relatively loose fit in the anchorages of the runner permitting easy installation and removal of the blocks. When at operating speed, however, fully reliable and calculable centrifugal forces preload the fir tree anchorages supporting the blade blocks against overturning cutting forces and in proper radial and angular position.

Axial position is determined by the axial lock shown in FIGS. 21 through 24, 39, 42 through 44. The axial lock consists of two half round members 220 and 222, each with abutting flat surfaces and matching center holes through the flat faces. Half round 222, preferably, is cut on its ends to the profile of the fir tree root so that it contributes to the fir tree anchorage. Half round 220 extends outwardly at each side when assembled into the transverse hole of the fir tree anchorage. Half round 222 is mounted in the hole opposed to half round 220. Half round 220 has its flat face to the front side of the block providing a flat seating surface. A tube 224 is then inserted into a bored hole in the end of the fir tree root and through holes 226 and 228 locking them in proper central location within the hole in the fir tree root of the block.

Figure 43:
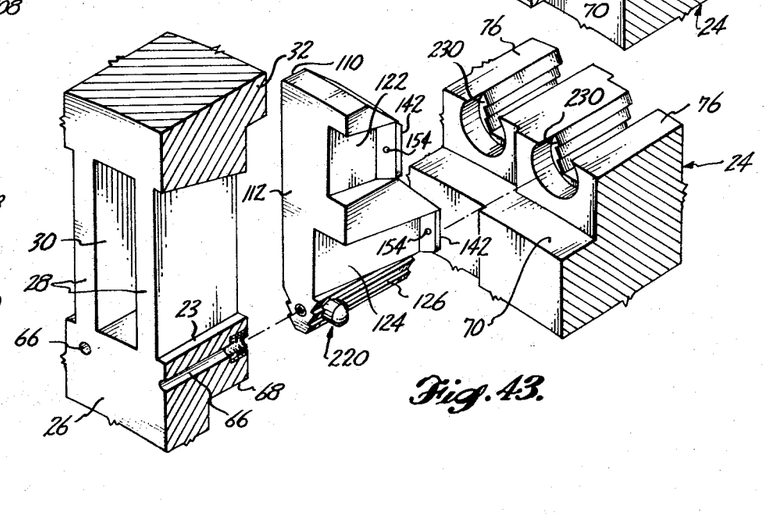
FIG. 43 is an exploded partial perspective showing a thin flake blade block ready for insertion of the fir tree root into the anchorage of the runner.

As noted in FIG. 43, the runner 24 has a bored seat 230 in the fir tree anchorage bored from the back side of the runner. The axial lock seats at the end of bored hole 230 are stepped to conform to the axial advance of the bladeline. Stepped surfaces at the face of the closure head are also stepped to conform with the blade line and the end of the blocks. When the runner with the blade blocks for the thin flake assembly and with pressure bar and blade blocks for the thick flake assembly is installed on the face of the proper closure head, all of the blades are held in proper and precise position conforming to the helical-spiral bladeline. The axial locks allow for some slight movement in seating of the fir tree roots in the anchorage of the runner as the cutterhead assembly accelerates to operating speed.

d. Jet Fluid Distributor, Seals and Passages.

A ⅛ inch nozzle, the approximate size required for jet breaking and fluid conveying of thick flakes, discharges about 20 cubic feet of air per minute at 80 pounds per square inch gage pressure. About three horsepower is required to compress this quantity of air. In the case of thin flakes, smaller nozzles may be used, but then more nozzles are required.

The thick flake head shown employs 32 blade blocks and nozzles. While improved nozzles might reduce the quantity of pressurized fluid required, only about 1/6 of the nozzles are in the slicing area at one time. The quantity of fluid in any case can be reduced many times if a means is provided to distribute the flow only to those nozzles in the working area.

In FIG. 1 a rotary shaft seal 20 is shown mounted upon the extended hollow shaft at the front of the driving motor attached by a flexible hose or other means to a stationary source of compressed air or other pressurized fluid. This rotary shaft seal is of the type commonly used to provide steam to, and removal of condensate through a stationary pipe or tube from, a rotary steam heated drum.

The stationary tube of the rotary seal, shown as 44 in FIGS. 3 and 5, is mounted within the hollow motor shaft terminating at a bearing support 46 and a distributor disc 48 shown in greater detail also in FIG. 37. Disc 48 has a distributor aperture 60 leading from the tube to the outer cylindrical surface. The rotary seal, stationary tube and distributor are normally mounted as a unit on and within the hollow shaft of the driving motor.

The tapered bore of the closure head is the same for thin and thick flake assemblies shown in FIGS. 3 and 5. The tapered bore seats on the shaft end and is closed at its end by threaded plate 62 leaving space for the distributor disc between the plate and the end of the shaft. Fluid passages 64, 92, lead from the central bore at the distributor to the periphery branching out as required to axial passages leading to each tube portion of each axial lock and blade block fir tree root of the runner when attached to the face of the closure head.

When installed on the extended shaft by means of bolts 42, the head and shaft rotate while the tube and distributor remain stationary. When compressed air or other fluid is admitted to the rotary seal, it travels through the tube and the aperture 60 of the distributor and is allowed to flow only to those passages leading to the nozzles of the blade holders only in the working area. The close fit of the distributor disc in the bore of the closure head prevents most all of the fluid from escaping out the other passages.

At the joint between the stepped platforms of the closure head and the fir tree root of the blade blocks, a fluid seal is provided. The seal comprises a housing or tube with a rolled internal flange at one end, a resilient cup 234, having a central aperture 236 and an internal compression spring 232 shown in FIGS. 23 and 24. The seal is mounted in a bored hole central to the passage and pressed into place so that the flange end of the housing tube is flush with the face of the closure head. When flaking and surfacing runner is attached to the face of the closure head, the resilient seal makes contact with the end of the fir tree root sealing the joint while air or other fluid passes through aperture 236 and tube 224 of the axial lock. Slight movement of the fir tree root in the anchorage of the runner may occur without disrupting the seal.

Passages 128, 130 and 132 in the thin flake blade blocks cooperate with the tube of the axial lock allowing fluid to flow to the blade holder slots. Comparable passages 176 are provided in the thick flake blade block.

In the thin flake blade holders, passages 152 and blade passage 146 terminate in nozzle 154 and also cooperate with the above passages in the blade holder slots providing a continuous passage of pressurized fluid from a stationary source to the nozzles in the slicing area.

In the thick flake blade holders, like passages 210 and blade passage 212 terminate in nozzle 214.

Assembly of the closure head on the extended shaft of the motor and of the runner and its related parts places the distributor, the passages, the seals and other parts in proper position and operating order.

3. Geometry and Principles of Design.

The helical-spiral (radially retreating-axially advancing) blade line, the basis for the flaking and surfacing head design, may best be considered first as a plane spiral (radially retreating) on which the helix (axial advance) is later superimposed.

The spiral is the "spiral of archimedes" having a constant rate of retreat or advance corresponding to the polar equation $r$ equals $a\theta$ wherein $r$ is the radius, $a$ is a constant, i.e., the advance or retreat per revolution and $\theta$ is the angle of rotation.

The spiral is related to the circle. The spiral in this case is made up of a series of circular arcs, one for each blade block, each of decreasing radius and—since for manufacturing reasons the blocks must all be identical—of increasing included angle.

The spiral corresponding to the above equation may best be generated by a point on the end of a thread as it unwinds from or winds upon a cylinder having a circumference equal to $a$ in the formula or the retreat (or advance) per revolution.

The helix or axial advance is simply the thickness of the flake desired or the axial advance per blade block superimposed upon the spiral.

Figure 11:
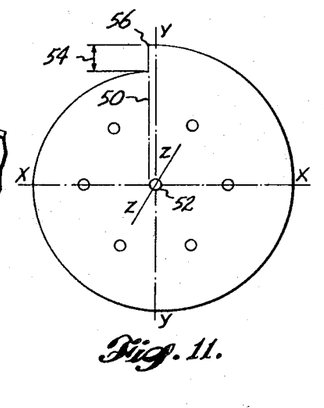
FIG. 11 is a diagram of the helical-spiral bladeline on the $x$, $y$, $z$ coordinates of analytic geometry used in the design of the cutterhead assembly.

The spiral is shown in FIG. 11. The $x$, $y$, $z$ coordinates of analytic geometry are used. The $x$, $y$ plane is the plane of rotation of the cutterhead and the plane of the spiral. The $z$ coordinate is the axis of rotation of the assembly and also represents the "offset" from the plate of the spiral. A positive $z$ coordinate offset and a positive rotation of the $x$, $y$ plane results in a right hand cutterhead while a negative offset and a negative rotation results in a left hand cutterhead. In FIG. 11, the thread line of the spiral is represented by 50, the thread cylinder by 52, the retreat of the spiral per revolution by 54. The retreat 54 is equal to the circumference of thread cylinder 52.

The cutting edges are on the thread line or radius from the point of tangency to the thread cylinder. The cutting edges or blades mounted in identical blade blocks must be equally spaced linearly along the spiral.

The linear space available for each blade block is the length of the spiral divided by the number of blade blocks desired. The length of the spiral is the average length of all of the circular arcs making up the spiral.

Arc length per blade block $$= \frac{3.1416 \text{ (maximum radius} + \text{minimum radius)}}{\text{Number of bladeblocks}}$$

Using lengths of circular arcs for unit radius available in engineering handbooks and degrees rather than radians, the position in angle and radius is calculated for each blade along the spiral. The helical position or axial advance is superimposed on the spiral along the $z-z$ axis.

The results of these calculations are best compiled into a chart locating each blade, black block and fir tree root by radius from the point of tangency to the thread cylinder, by included angle from zero and by axial offset from the $x$, $y$ plane.

In the case of the thick flake head, the procedure is the same except for half rather than a full revolution.

While a circle is closed a spiral is open permitting work to be introduced and removed at the open ends. The spiral is of little use near its point of origin, but improves with size. Therefore, there is a minimum practical size or radius to the spiral configuration. Because of physical limitations in use and manufacture, it cannot be too large either. The size outlined is best suited to the cutting of quality flakes from and surfaces upon residual lumber products generally not over 16 inches wide and produced in two inch multiples of width.

4. Operations.

In FIG. 1, a log, a cant or a board is shown supported by suitable means moving longitudinally away from the observer and into the cutterhead assembly of the flaking and surfacing unit 10 and closure and hogging head 12. Protuberances, hogged away by hogging head 12 are discharged to waste conveyor 16. Flakes, sliced and broken away from the parent wood and fluid conveyed through the passageways of the cutterhead assembly, are discharged to flake collector 14 and thence to an exhauster duct. Motor 18 drives the cutterhead assembly mounted on its extended driving shaft. A pressure joint 20 at the front of the motor provides for introduction of pressurized fluid to the rotating motor shaft.

In some soft woods, for example, a cutting force of 12 pounds is required to cut thin flakes .011x1 inch using a micro-sharpened blade. The assumed maximum cut is of a 2 × 12 area at 100 feet per minute. In the case of the thin flake assembly, 19 blades would be in the cut at an average radius of 1.5 feet. At 1200 rpm, the power requirement computes to 72 horsepower. Ordinarily a full cut would not occur together with a hogging cut. The intermittent hogging cut does not enter into horsepower computations. Some power is used to accelerate the flakes and to overcome friction and windage losses.

For thick flakes ⅛ x 1 inch, the cutting load, including the friction load of the pressure bars approximates 50 pounds per blade. For the same 2x12 area and 100 feet per minute feed speed, with 4 pressure bar and blade assemblies in the cut and at 600 rpm, the power requirement computes to 37 horsepower. A 100/50 HP, 1200/600 rpm, 250 percent pullout squirrel cage motor of low slip design will serve to drive the interchangeable cutterhead assemblies.

I claim:

1. A cutterhead assembly for cutting, breaking, and conveying of flakes from a woody substance, comprising:
   a. a rotatable disc type flaking and surfacing head having a series of generally radially disposed cutting edges located in a radially retreating-axially advancing blade line;
   b. discharge passageway means for said cutting edges providing for axial discharge of flakes severed from said woody substance; and
   c. pressure fluid nozzle outlet means in predetermined proximate position to said cutting edges for breaking said flakes from said woody substance.

2. The cutterhead assembly of claim 1 and in which a closure and optional hogging head is detachably mounted on a driven shaft and which closure head removably supports said flaking and surfacing head.

3. The cutterhead assembly according to claim 2 and in which said closure and said surfacing and flaking heads are provided with fluid passage means for conducting pressurized fluid to said nozzle means.

4. The cutterhead assembly of claim 3 and in which said driven shaft is provided with means for delivering fluid under pressure to said fluid passage means in said closure head which in turn deliver said fluid to fluid passage means in said surfacing and flaking head.

5. A cutterhead assembly for cutting, breaking, and conveying of flakes from a woody substance comprising:
   a. a rotatable disc type member having generally radial cutting blades arranged on its periphery in a series along a radially retreating-axially advancing blade line, the final blade of said series extending slightly beyond the face of said member;
   b. discharge passageways between said blades to provide axial discharge of the flakes cut from the woody substance;
   c. nozzles for jet breakers in the cutting area of said discharge passageways connected by pressurized fluid passageways radiating from a hollow rotatable supporting and drive shaft to a stationary pressure source;
   d. closure flange of larger diameter than said discharge passageways making a rotatable closure relative to a stationary flake collector;
   e. means for rotating said shaft, said closure flange and said member; and
   f. means for feeding said woody substance longitudinally with the grain, in a direction perpendicular to the axis of rotation of said member, at a speed not greater than the radial retreat of said blade line and within the axial advance of the series of blades in said blade line whereby wood flakes will be cut to predetermined thickness and length, jets of pressurized fluid will break the random width slices to a range of width and said fluid will convey said flakes from the cutting and breaking area through said passageways, to the discharge side of said rotatable member to said stationary flake collector.

6. The combination of claim 5, including a pressure bar preceding and cooperating with each cutting blade in producing thick flakes from a woody substance.

7. The combination of claim 5, including a plurality of hogging means on the periphery of said closure flange beginning at the plane of the first blade in said blade line and extending axially therefrom in a direction opposite from the axial advance of said blade line, at a radius greater than the radius of said first blade in said blade line and greater than said discharge passageways whereby any limbs, flares and other protuberances presented thereto will be hogged and discharged separately from the wood flakes.

8. The combination of claim 5, including fluid distributor means within said hollow drive shaft comprising a stationary tube terminating in means having a fluid outlet for directing pressurized fluid to a portion of outer periphery of said disc member.

9. A cutterhead assembly of the character described comprising:
   a. a rotatable closure and supporting member removably mountable upon a hollow driving shaft and having an annular outer flange, a face within said flange, means for detachably securing a flaking and surfacing runner on said face, stepped surfaces and through flake passageways arranged in series along a radially retreating-axially advancing bladeline of said detachably secured runner, a closure surface on the back side of said closure member of larger diameter than said flake passageways defining a rotatable closure with a stationary flake collector;
   b. a flaking and surfacing runner detachably securable cooperatively with securing means on said face of said closure head having radially retreating-axially advancing fir tree anchorages on its periphery, and including a face side and a back mounting side with seats for axial locks cooperating with stepped surfaces of said closure member;
   c. blade blocks comprising a body having a face side, a back side, a front side and a rear side with integral fir tree root means of support extending from face side to back side, an axial lock hole extending transversely through the axis of said fir tree root near the back side of said body of said block, a locking tube passage in and parallel with axis of said fir tree root and extending centrally through said lock hole, a generally rectangular blade holder slot extending at an angle to the face side of said block generally from the front side edge through to the rear side of the block, a portion of the front side being removed and tapering to the back side providing an expanding flake discharge passageway from said front side of said blade holder slot, the blocks forming a substantially closed outer periphery when assembled in said runner;
   d. an axial lock in said lock hole of said blade block consisting of a first half round having a central through hole and having the profile of said fir tree root at its ends, a second half round also having a central through hole and being of greater length than the width of said fir tree anchorage, and locking tube means extending through said first and second half rounds, said lock providing axial positioning of said blade block when assembled between said runner and closure member;
   e. preload blade holders for disposable blades pressed within said rectangular blade holder slot of said blade block consisting of a pair of generally rectangular holder plates each arch formed with the concave surfaces thereof facing each other to receive there a disposable blade, alignment means between said holder plates holding said plates and blade in proper position with respect to each other, and a stop means providing precise positioning of said blade and holders within said slot of blade blocks;
   f. disposable wood flake cutting blade for said cutterhead assembly including a generally flat rectangularly shaped metallic body portion, said blade having a cutting edge formed along one edge thereof and also including means in said body portion for being held in alignment between said blade holders;
   g. pressurized fluid passageways from the central mounting area of said closure member radiating and branching to said stepped surfaces into alignment with said locking tube means of said fir tree roots to nozzle means in the cutting area of said blade block for jet breaking and fluid conveying of said flakes;
   h. fluid pressure seals at the end of said pressurized fluid passageway in said closure member facing said locking tube means of said blade blocks comprising:
      1. a tubular housing having an inner end adapted to be received at the inner end of a cavity coaxially with a fluid passageway and including at the outer end an annular internal flange;
      2. an apertured cup slidably received in said tube with the apertured end of said cup against the internal annular flange end of said tubular housing; and
      3. compression spring means within said resilient cup of larger diameter than said aperture pressing the apertured end of said cup against a coacting fluid entrance to a blade block effecting a seal against leakage of pressurized fluid.

10. The combination of claim 9, including fluid distributor means within said hollow driving shaft means comprising a stationary tube attached at one end to a rotary pressure seal, and supported at its opposite end by an internal bearing means in said hollow shaft, said tube terminating in an enlarged portion having a fluid outlet leading to a selected segment of said fluid passageways in said closure member.

11. The combination of claim 9, including a pressure bar block preceding each blade block for cooperative employment in the cutting of thick flakes comprising:
   a. a body having a face side, a back side, a front side and a rear side with integral fir tree root support means extending from face side to back side, a hole through the axis transversely of said fir tree root accommodating said axial lock, a bar cavity extending from the corner of said face side and said rear side angularly to said back side and located to accommodate the shank of a pressure bar clamped in place by a jack lock set in a wedging cavity;
   b. a pressure bar in said bar cavity having a shank and a tungsten carbide facing on that portion of said bar which engages the wood being cut;
   c. a jack lock wedge for clamping said pressure bar in place in said bar cavity; and
   d. said disposable blade having opposed wing sections at the body edges intersecting said cutting edge, said wing sections extending outwardly at an angle to one face of said blade body and having cutting edges merging with said body cutting edge.

12. The combination of claim 9, including sockets for hogging cutters on the periphery of flange of said closure member for insertion of inserted toothed cutters whereby any limbs, flares and other protuberances presented thereto will be hogged and discharged separately from the wood flakes.

13. In a wood cutting device a cutterhead assembly, comprising:
   a. a rotatable closure head means removably mounted on a driven shaft and including a mounting face, said closure head having a central portion and a peripheral flange portion of greater diameter than said central portion, said central and peripheral portions being interconnected by a connecting portion comprised of a plurality of radially spaced connector means defining flake passageways therebetween; and
   b. a flaking and surfacing head detachably mounted on the mounting face of said closure head and having a cutting face and a rear face, said flaking and surfacing head a plurality of generally radially disposed cutting edges generally arcuately and uniformly spaced and serially positioned to define a helically advancing spirally retreating knifeline.

14. The cutterhead assembly according to claim 13, and in which said cutting edges are supported in said flaking and surfacing head in removable blade blocks, said blade blocks being supported by generally axially formed coacting fir tree root anchoring means.

15. The cutterhead assembly of claim 14, and in which said closure head and said flaking and surfacing head have a plurality of coacting fluid passageways, said fluid passageways being formed so as to deliver fluid under pressure to a predetermined location in said flake passageways with respect to each of said cutting edges.

16. The cutterhead assembly of claim 15, and in which said shaft is hollow and together with said closure head contains means for selectively directing fluid to fluid passageways within said closure and flaking and surfacing heads.

17. The cutterhead assembly of claim 13, and in which said closure head is of generally greater circumference than said flaking and surface head and wherein its periphery is provided with holding means for optionally receiving hogging cutter means.

18. In a cutterhead assembly the improvement, comprising: a closure head means removably mounted on a driven shaft and having a supporting face adapted to receive a flaking and surfacing head means thereon, said closure head including:
 a. a generally central mounting portion having a peripheral surface;
 b. a plurality of generally radially disposed and spaced apart connector sections extending outwardly from said peripheral surface and defining passageways therebetween;
 c. an annular flange portion attached to said connector sections to form a generally solid peripheral edge section for said closure head; and
 d. said supporting face having a series of stepped surfaces thereon defining a spirally retreating-helically advancing line.

19. The closure head means according to claim 18, and in which said mounting portion of said closure head is provided with a plurality of pressure fluid passages leading from a central location with respect to said shaft and extending to preselected locations in proximity to said peripheral surface.

20. The closure head means according to claim 19, and in which said shaft is provided with means for delivering fluid under pressure to said central location.

21. The closure head means according to claim 20, and in which said shaft is hollow and provided with a pressure fluid conduit having a distributor means thereon limiting flow of fluid to cutters only when in the cutting area.